United States Patent [19]

Uryu et al.

[11] Patent Number: 4,885,369

[45] Date of Patent: Dec. 5, 1989

[54] PHOTOCONDUCTIVE MATERIAL FOR ELECTROPHOTOGRAPHY COMPRISING RHODANINE DERIVATIVE CHARGE COMPLEX

[75] Inventors: Toshiyuki Uryu, Tokyo; Toshihiko Nishiguchi, Osaka, both of Japan

[73] Assignee: Mita Industrial Co., Ltd., Osaka, Japan

[21] Appl. No.: 278,237

[22] Filed: Nov. 30, 1988

[30] Foreign Application Priority Data

Nov. 30, 1987 [JP] Japan ................................. 62-301706
Nov. 30, 1987 [JP] Japan ................................. 62-301716
Nov. 30, 1987 [JP] Japan ................................. 62-301721
Nov. 30, 1987 [JP] Japan ................................. 62-301722
Nov. 30, 1987 [JP] Japan ................................. 62-301723

[51] Int. Cl.$^4$ .......................... G03G 5/06; G03G 5/07
[52] U.S. Cl. ..................................... 548/183; 546/280; 430/77; 430/58; 430/106; 252/500; 252/501.1
[58] Field of Search .................. 430/77, 106; 548/183; 546/280

[56] References Cited

U.S. PATENT DOCUMENTS 3,912,507 10/1975 Keller et al. ........................... 430/77
3,961,952 6/1976 Sprague ................................ 430/77

OTHER PUBLICATIONS

Chemical Abstracts vol. 74: 64559z.
Chemical Abstracts vol. 86: 148759a.
Chemical Abstracts vol. 83: 18998e.

*Primary Examiner*—J. David Welsh
*Attorney, Agent, or Firm*—Sherman and Shalloway

[57] ABSTRACT

A photoconductive material for use in electrophotography comprising a rhodanine derivative and a halogen-containing polymer. The marked feature of the invention is to use a compound of the following formula

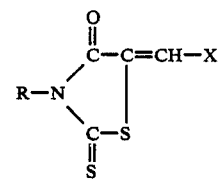

wherein X represents

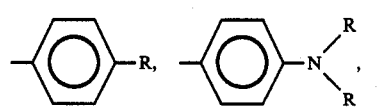

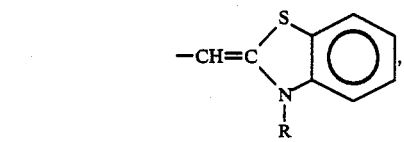

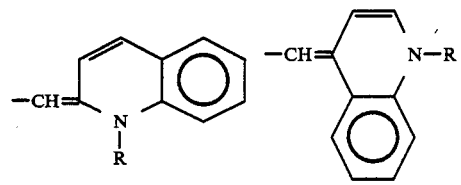

and R represents a substituent such as an alkyl, aryl or amino group.

4 Claims, No Drawings

PHOTOCONDUCTIVE MATERIAL FOR ELECTROPHOTOGRAPHY COMPRISING RHODANINE DERIVATIVE CHARGE COMPLEX

BACKGROUND OF THE INVENTION

1. Field of the Invention

This invention relates to an organic photoconductive material for electrophotography which is used as an electrophotographic material or a photoconductive toner.

2. Description of the Prior Art

An electrophotographic material is a practical device in which an organic photoconductive compound is used.

Polymeric photoconductive compounds such as polyvinylcarbazole (PVCz) and low-molecular-weight photoconductive compounds such as hydrazone derivatives have been widely known as organic photoconductive compounds for use in the electrophotographic material. Since the photoconductive polymers do not show conductivity to visible light and the low-molecular-weight photoconductive compounds do not generate carriers under visible light, they cannot be used alone in the electrophotographic material, but must be sensitized to a visible light region by combining them with electric charge-generating pigments.

Accordingly, in the production of electrophotographic materials, it is necessary to disperse a charge-generating pigment in a binder polymer. Pigments are generally insoluble in solvents, and are extremely difficult to disperse uniformly in binder polymers. Even when uniform dispersion can be effected, the stability of the resulting dispersion is not satisfactory. Furthermore, since pigments are flocculated particles, variations in pigment manufacturing conditions greatly affect the electrophotographic properties of the resulting electrophotographic material. The properties of pigments must therefore be controlled in order to eliminate such an adverse effect.

SUMMARY OF THE INVENTION

It is an object of this invention to provide a photoconductive material for electrophotography which shows photoconductivity under visible light without the need for adding a charge-generating pigment.

According to this invention, there is provided a photoconductive material for electrophotography comprising a rhodanine derivative and a halogencontaining polymer, the rhodanine derivative being represented by the following general formula (I)

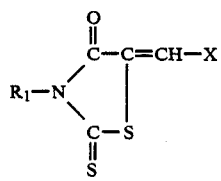

(I)

wherein $R_1$ represents a substituted or unsubstituted alkyl, aralkyl, aryl or amino group, and X represents a substituent selected from the class consisting of

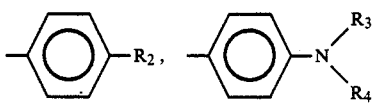

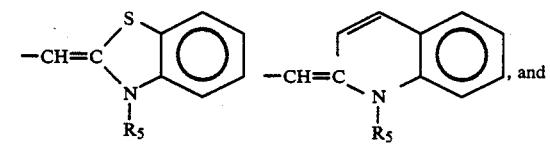

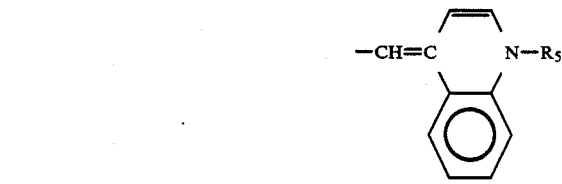

in which $R_2$ represents a lower alkyl group having 1 to 6 carbon atoms, or a hydroxyl group, $R_3$ and $R_4$ are identical or different and each represents hydrogen, an alkyl group or an aryl group, and $R_5$ represents hydrogen, a lower alkyl group having 1 to 6 carbon atoms, an aryl group or a hydroxyl group.

DETAILED DESCRIPTION OF THE INVENTION

The marked feature of the invention is that the photoconductive material comprises the rhodanine derivative of general formula (I).

As can be clearly seen from the type of the group X in general formula (I), either one of the following groups are introduced into the 5-position of the rhodanine ring in the rhodanine derivative of general formula (I).

(a) Benzylidene group

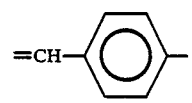

(b) Benzothiazoline group introduced through an ethanediylidene group

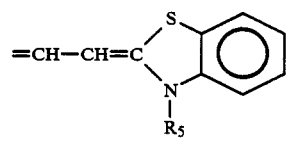

(c) Quinoline group introduced through the ethanediylidene group

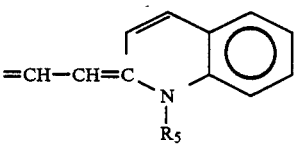

(d) Quinoline group introduced through the ethanediylidene group

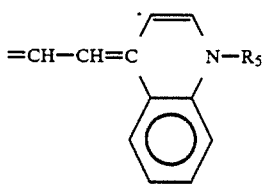

In other words, the rhodanine derivative used in this invention is characterized by the fact that it forms an intramolecular charge migration-type complex in which the rhodanine ring moiety is an electron acceptor and the moiety having any of the groups (a) to (d) introduced therein is an electron donor, and that the introduced group moiety as the electron donor is linked to the rhodanine ring moiety as the electron acceptor through a conjugated bond =CH—CH=. In the rhodanine derivative, $\pi$-electrons existing non-localizingly in the electron donor in the ground state absorb light energy upon irradiation of visible light and transit to an empty orbit of the electron acceptor. Consequently, color formation occurs. This rhodanine derivative shows conductivity to visible light.

The photoconductivity of this rhodanine derivative is exhibited markedly by using a halogen-containing polymer as a binder polymer.

In a polymer having a strongly electron attractive substituent such as halogen, polarization occurs in the vicinity of the substituent, and the electric field generated by this is considered to promote the intramolecular charge migration of the rhodanine derivative.

Another characteristic of the rhodanine derivative used in this invention is that it assumes a brilliant color according to the type of the group introduced into the 5-position of the rhodanine ring. Specifically, when the group (a) is introduced, the rhodanine derivative shows an organic to yellow color. When the group (b) is introduced, the rhodanine derivative shows a red color. When the groups (c) or (d) is introduced, the resulting rhodanine derivative assumed a blue color.

Since these colors are pervious to light, a lightpervious colored polymer composition can be formed from the rhodanine derivative (I) and the halogen-containing polymer.

The rhodanine derivative used in this invention is represented by the following general formula (I).

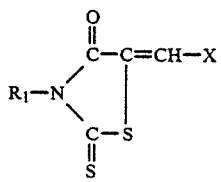

In the formula, $R_1$ represents an alkyl, aralkyl, aryl or amino group.

The alkyl group may be a lower alkyl group such as methyl, ethyl, propyl, isopropyl, butyl, isobutyl, tertbutyl, pentyl or hexyl. The alkyl group may have a substituent such as a carboxyl, aldehyde or hydroxyl group or a halogen atom.

Examples of the aralkyl group are benzyl, phenethyl and naphthylmethyl groups. It may have a substituent, for example a carboxyl group, an aldehyde group, a hydroxyl group, a halogen atom, an alkoxy group such as methoxy, ethoxy or propoxy, an amino group, or an alkylamino group such as dimethylamino, diethylamino or dipropylamino.

Examples of the aryl group are phenyl, naphthyl, anthryl, phenanthryl, fluorenyl or 1-pyrenyl. The aryl group may have a lower alkyl group having not more than 6 carbon atoms as a substituent.

The amino group may also have a lower alkyl group having not more than 6 carbon atoms as a substituent.

In general formula (I), the group X represents either one of the following groups.

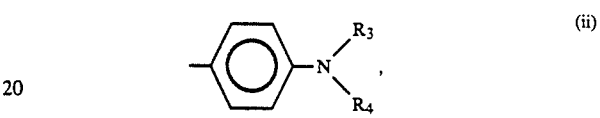

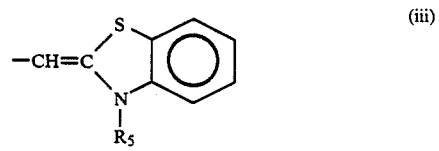

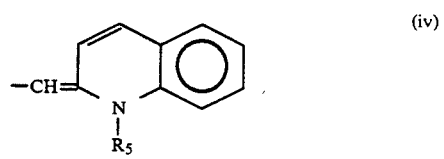

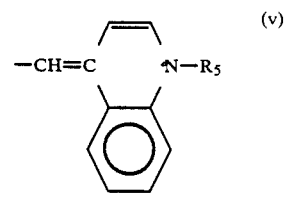

The groups (i) and (ii) correspond to the group (a) indicated above, and the groups (iii) to (v) correspond respectively to the groups (b), (c) and (d) indicated above.

$R_2$ in group (i) represents a lower alkyl group having not more than 6 carbon atoms such as methyl, ethyl, propyl, isopropyl, n-butyl, isobutyl, tert-butyl, pentyl or hexyl, or a hydroxyl group.

$R_3$ and $R_4$ in group (ii) are identical or different, and each represents the same lower alkyl group having not more than 6 carbon atoms as mentioned above, the same substituted or unsubstituted aryl group as mentioned with respect to $R_1$, or hydrogen.

$R_5$ in group (iii) represents the same lower alkyl group or substituted or unsubstituted aryl group as mentioned above with respect to groups $R_3$ and $R_4$, a hydrogen atom or a hydroxyl group.

When an amino group is bonded to the benzene ring of the benzylidene group (a) and an alkyl substituent is bonded to the amino group. The electron donating property of this amino group is reduced as the number of carbon atoms of the alkyl substituent increases and the absorption wavelengths of the rhodanine derivative tend to shift to a shorter wavelength side. Accordingly, to limit the light absorption of the rhodanine derivative to a visible light region, it is desirable to use an unsubstituted amino group or use an alkyl group having not more than 3 carbon atoms such as methyl, ethyl propyl or isopropyl as the alkyl substituent boneded to the amino group.

Specific Examples of the Rhodanine
Derivative and Examples of Synthesis

The rhodanine derivative of general formula (I) can be obtained by various methods as shown below.

(a) Benzylidene group

A rhodanine derivative (I) having a benzylidene group may be produced by reacting equimolar proportions of a 3-substituted rhodanine and a p-substituted benzaldehyde. This reaction is shown by the following formula (1-a).

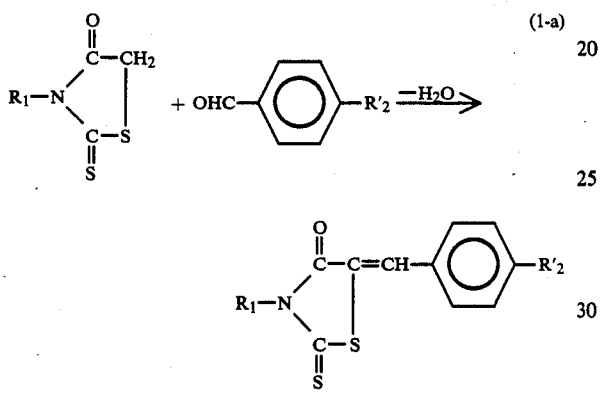
(1-a)

In the formula (1-a), $R_1$ is as defined above, and $R'_2$ represents the aforesaid group $R_2$ or

Some examples of the rhodanine derivatives obtained by the above reaction are shown below.

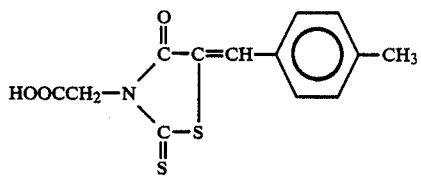

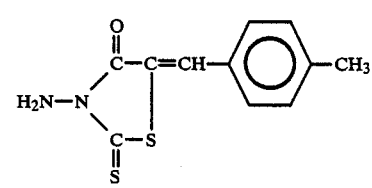

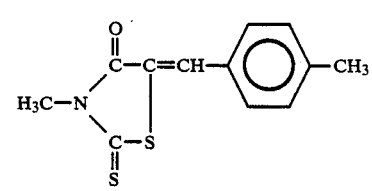

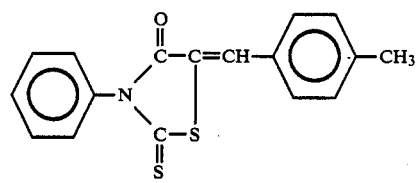

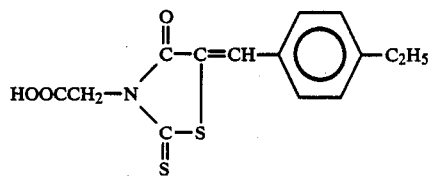

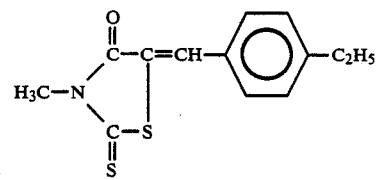

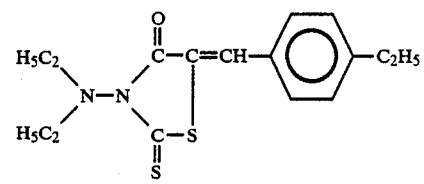

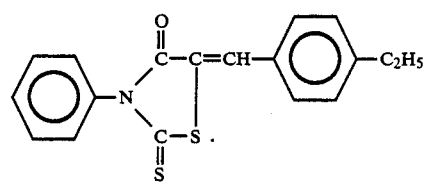

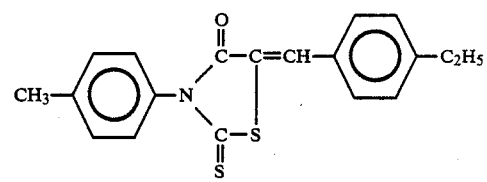

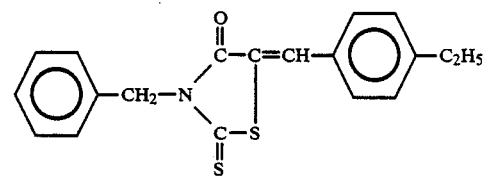

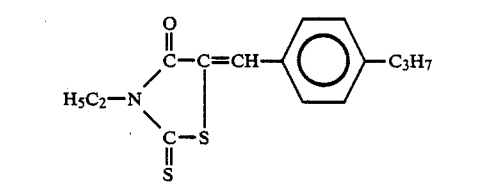

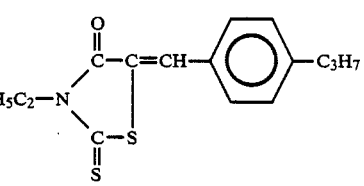

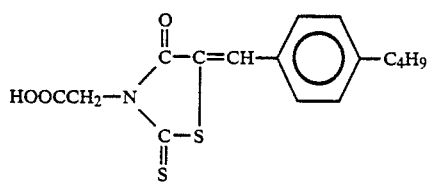
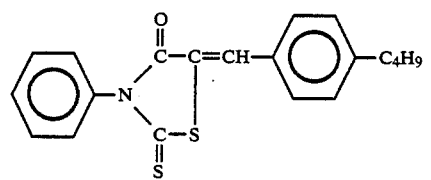
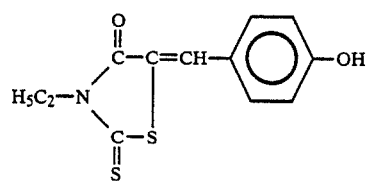
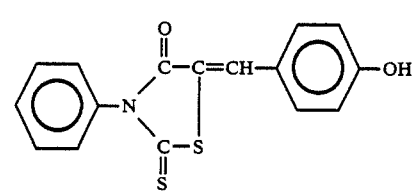
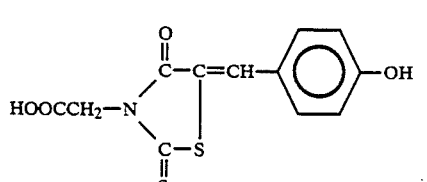
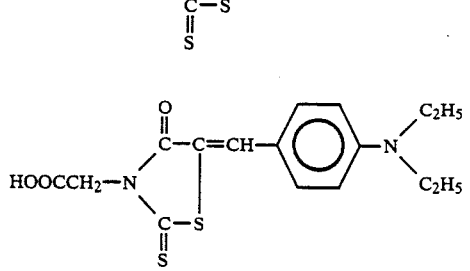
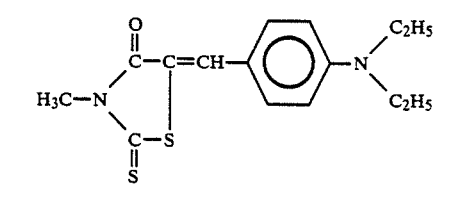
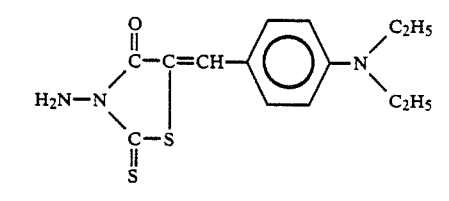
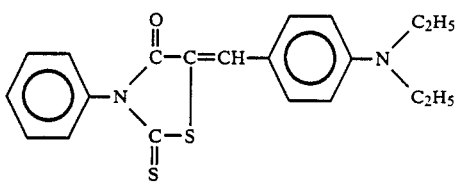
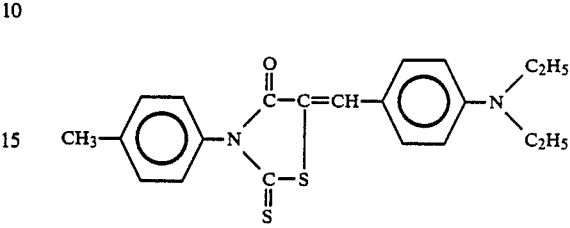
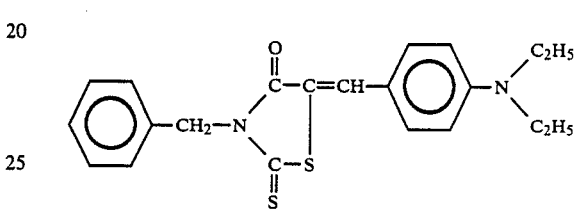
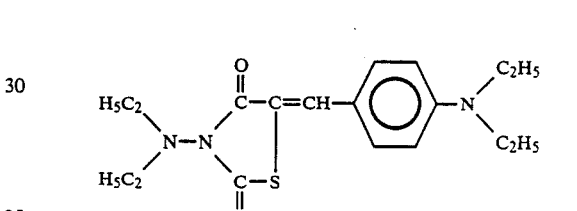
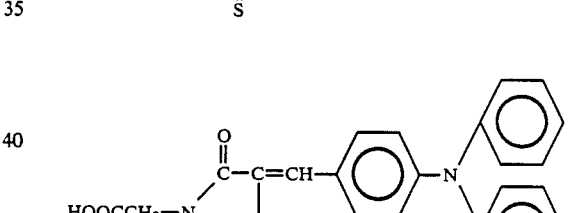
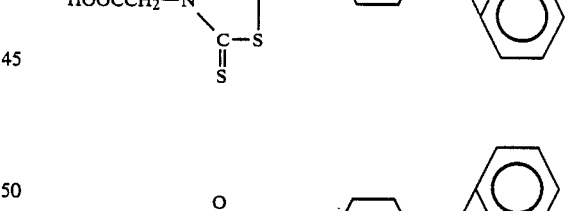
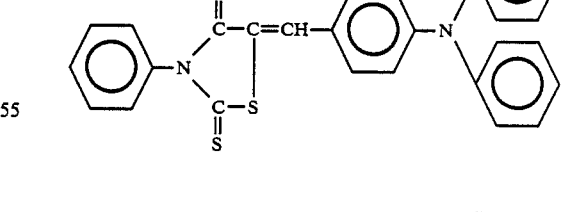
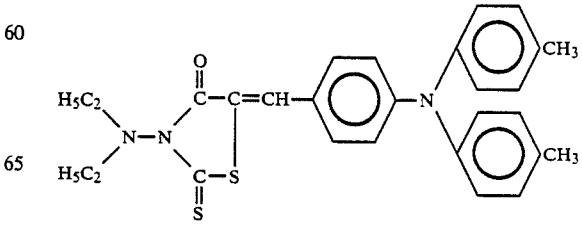

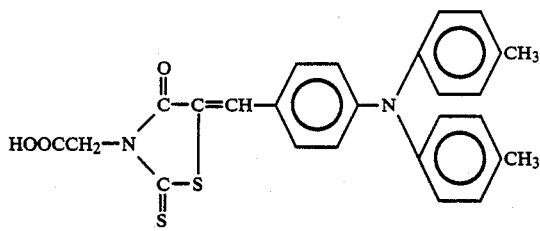
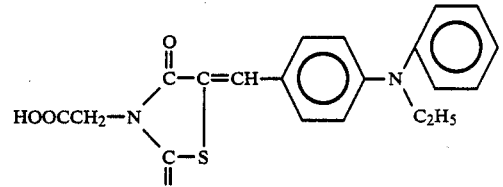
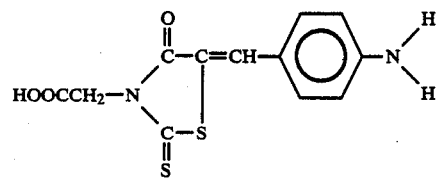
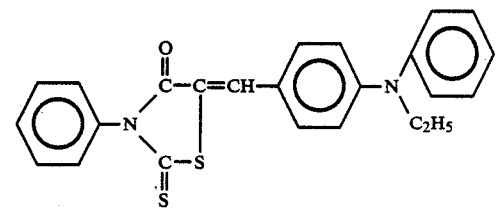

(b) Benzothiazoline group introduced through the ethanediylidene group

A rhodanine derivative (I) having the benzothiazoline group may be obtained by reacting a 3-substituted rhodanine and a 2-β-acetoanilide vinylbenzothiazole alkyliodide in an alcohol. This reaction is shown by the following formula (1-b).

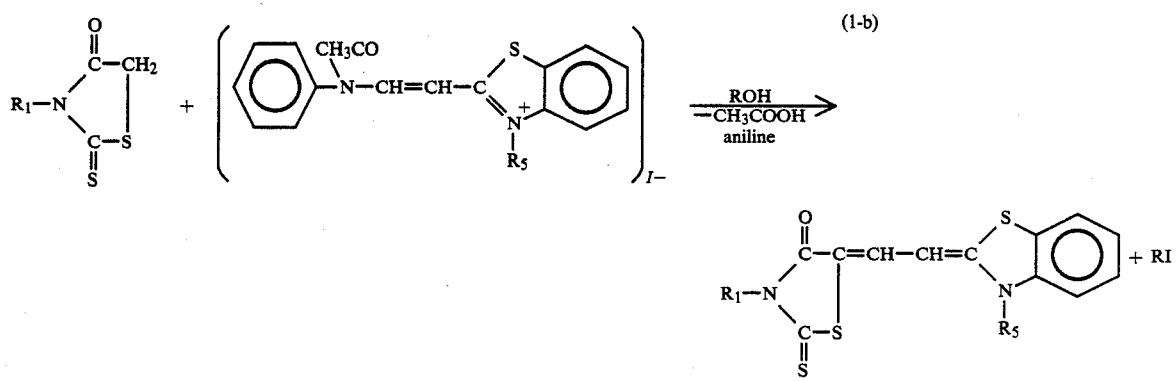

(1-b)

In the above formula (1-b), $R_1$ and $R_5$ are as defined above.

Some examples of the rhodanine derivative obtained by the above reaction are shown below.

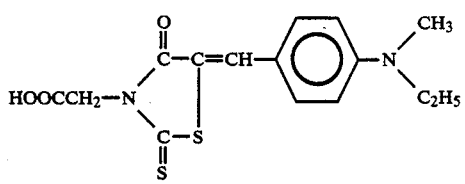
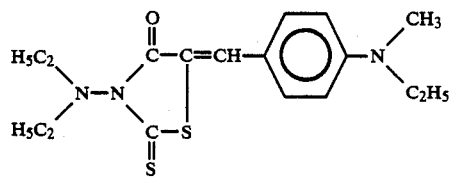
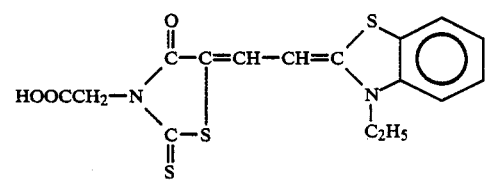
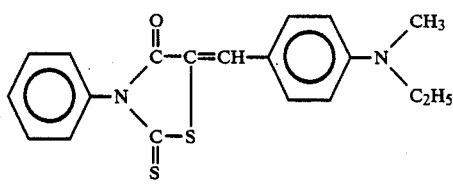
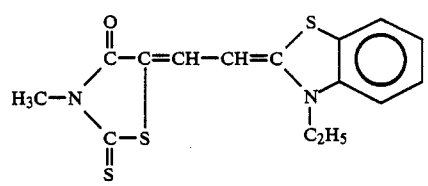

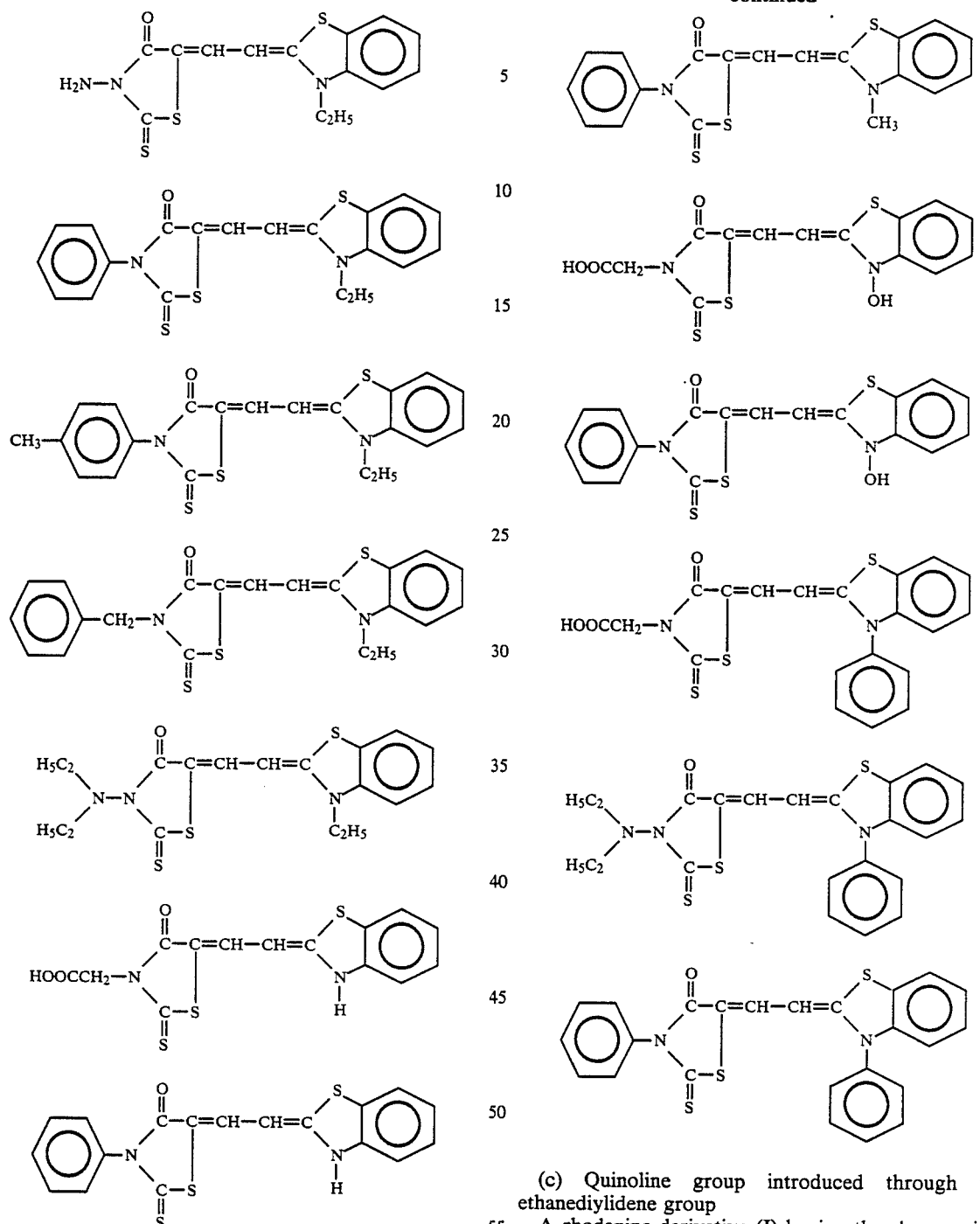
(c) Quinoline group introduced through the ethanediylidene group
A rhodanine derivative (I) having the above quinoline group may be obtained by reacting a 3-substituted rhodanine and a 2-β-acetoanilide vinylquinoline alkyliodide in an alcohol. This reaction is shown by the following formula (1-c).
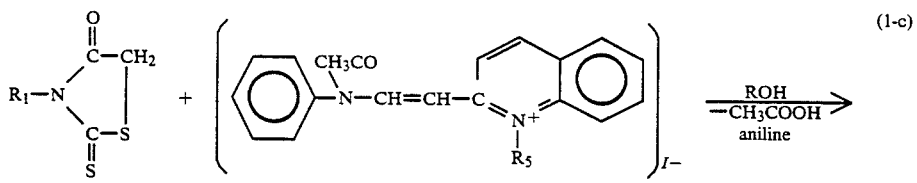

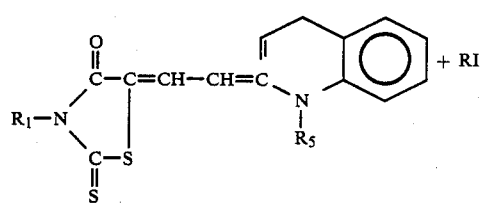
In the formula (1-c), $R_1$ and $R_5$ are the same as mentioned above.
Some examples of the rhodanine derivatives obtained are shown below.
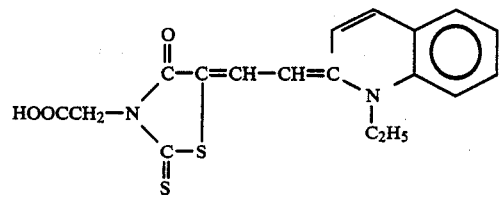
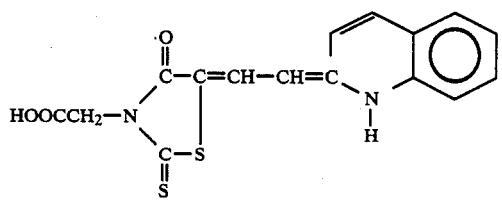
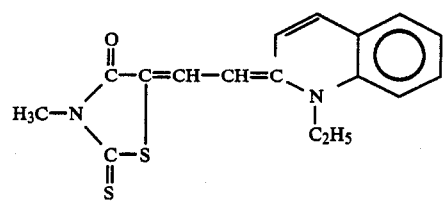
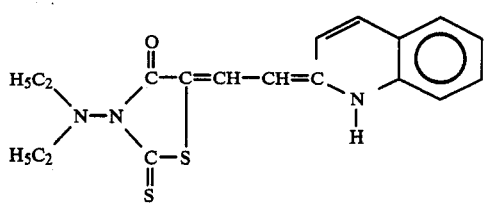
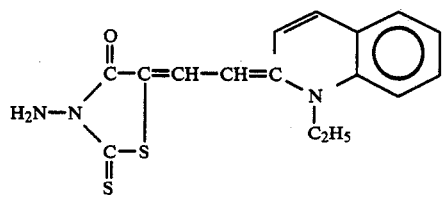
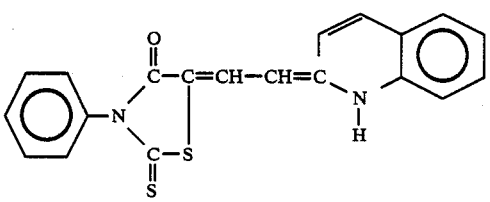
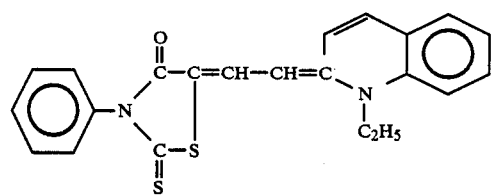
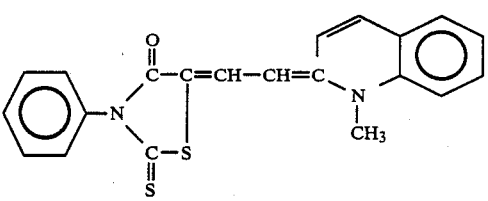
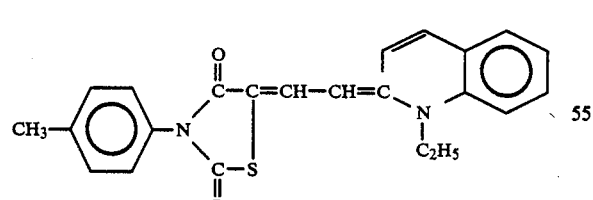
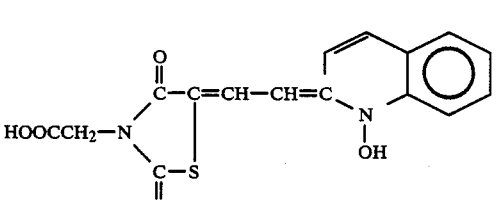
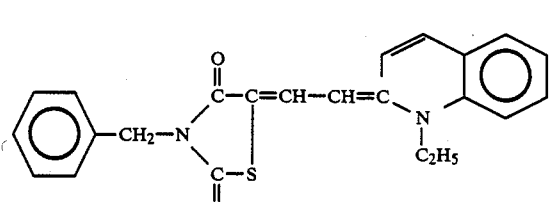
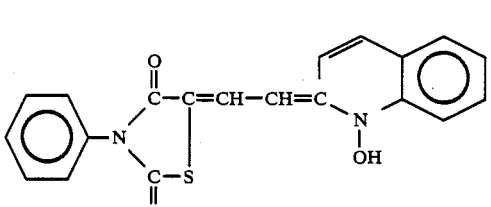

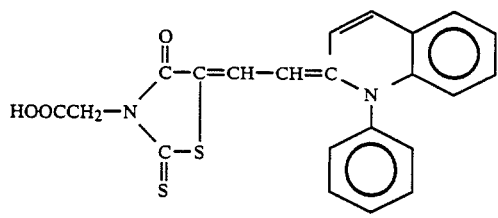

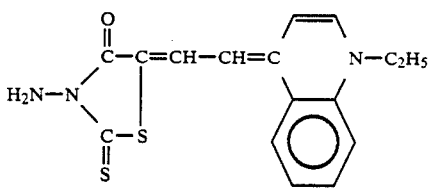

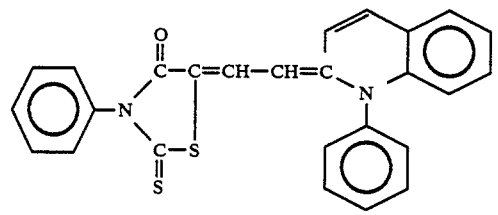

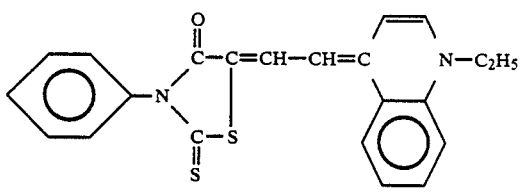

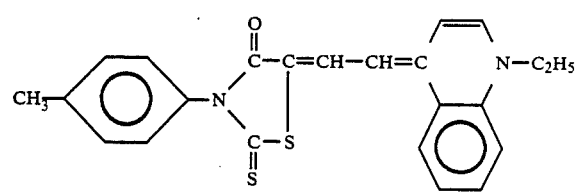

(d) Quinoline group introduced through the ethanediylidene group

A rhodanine derivative (1) having the above quinoline group may be obtained by reacting a 3-substituted rhodanine and a 4-β-acetanilide vunylquinoline alkyliodide in an alcohol. This reaction is shown by the following formula (1-d).

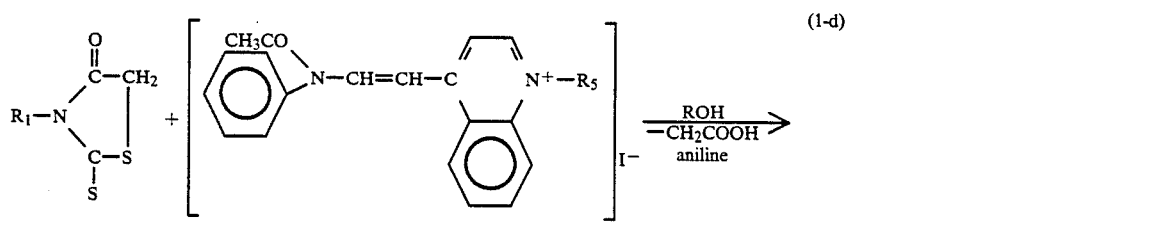

(1-d)

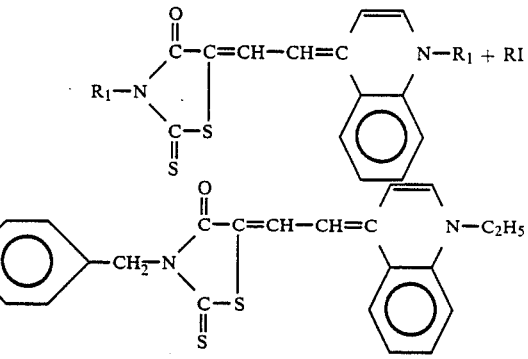

In the formula (1-d), R₁ and R₅ are as defined above.
Some examples of the rhodanine derivative obtained by the above reaction are shown below.

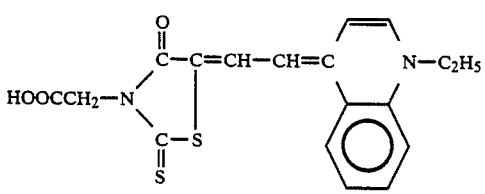

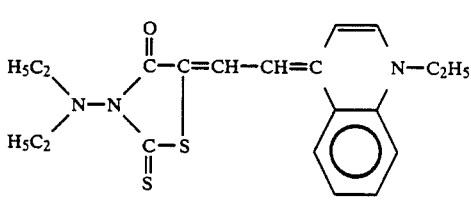

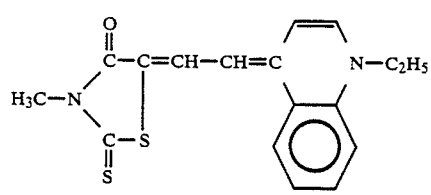

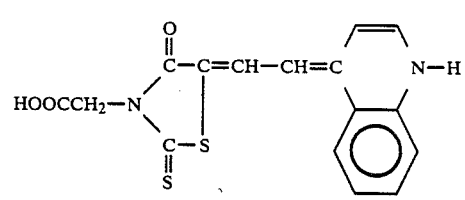

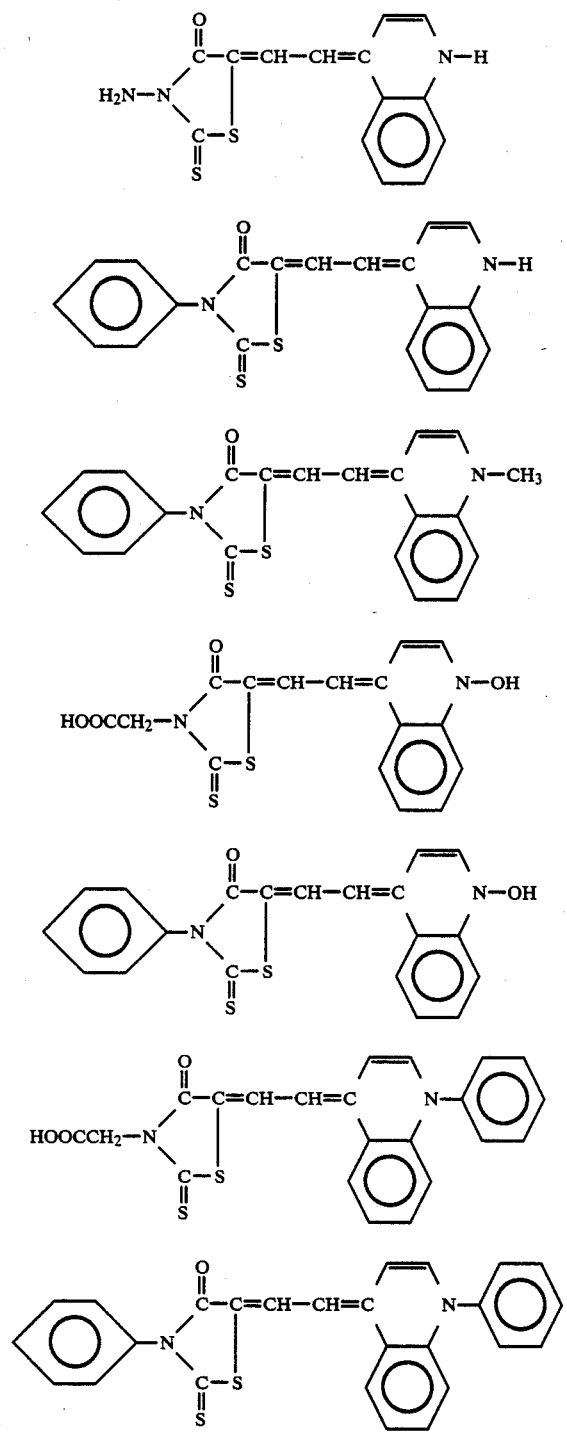

Photoconductive Material

A photoconductive material may be produced by combining the rhodanine derivative (I) with a known halogen-containing polymer, and can be used in various electrophotographic applications, for example as an electrophotographic material or a photoconductive toner.

Examples of the halogen-containing polymer that can be used in this invention include chlorine-containing polymers such as polyvinyl chloride resin, polyvinylidene chloride resin, polychloromethylstyrene, vinyl chloride/vinyl acetate copolymer, and chloromethylated styrene/styrene copolymer and fluorinecontaining polymers such as polyvinyl fluoride, polyvinylidene fluoride, polychlorotrifluoroethylene, polytetrafluoroethylene, and tetrafluoroethylene/hexafluoropropylene copolymer.

The various rhodanine derivatives (I) used in this invention can be divided into four groups (a) to (d) according to the type of the substituent introduced into the 5-position of the rhodanine ring. These groups assume their inherent colors.

For example, rhodanine derivatives of group (a) containing the benzylidene group assume brilliant yellow to orange with good light-perviousness. Those containing the amino group become orange.

Rhodanine derivatives of group (b) containing the benzothiazoline group assume red. Rhodanine derivatives of groups (c) and (d) containing the quinoline group assume blue.

Thus, according to the degree of coloration, the light-sensitive wavelength region of the photoconductive material slightly differs. Hence, the desired substituent groups can be selected according to the purpose for which the resulting photoconductive material is used.

Electrophotographic Material

The rhodanine derivative of formula (I) has good compatibility with, or dispersibility in, resins. An electrophotographic material may be produced by preparing a solvent-containing coating composition from the rhodanine derivative and the halogen-containing polymer, coating the composition on a conductive substrate, and drying it.

Preferably, in view of the light sensitivity and durability of the resulting electrophotographic material, it is preferred to use 20 to 200 parts by weight, preferably 40 to 100 parts by weight, of the rhodanine derivative per 100 parts by weight of the halogen-containing polymer. If the amount of the rhodanine derivative is less than the specified limit, the sensitivity of the electrophotographic material tends to decrease. If, on the other hand, it exceeds the specified upper limit, the mechanical strength of the resulting light-sensitive layer is reduced, or the light-sensitive layer is difficult to form as a uniform thin layer.

In the combination of the rhodanine derivative and the halogen-containing polymer in this invention, various known additives may be incorporated so as to improve the performance of the light-sensitive layer. For example, a known charge-transport material may be added to increase its sensitivity.

Specific examples of the charge-transport material include electron accepting substances having electron accepting groups such as nitro, nitroso and cyano groups, for example fluorenone compounds such as tetracyanoethylene and 2,4,7-trinitro-9-fluorenone and nitro compounds such as dinitroanthracene and 2,4,8-trinitrothioxanthone; and electron donating substances, for example hydrazone compounds such as N,N-diethylaminobenzaldehyde, N,N-diphentlhydrazone, N-methyl-3-carbazolealdehyde and N,N-diphenylhydrazone, oxadiazole compounds such as 2,5-di(4-N,N-dimethylaminophenyl)-1,3,4-oxodiazole and 2,5-di(4-N,N-diethylaminophenyl)-1,3,4-oxodiazole, styryl compounds such as 9-(4-diethylaminostyryl)anthracene, carbazole compounds such as N-ethylcarbazole, pyrazoline compounds such as 1-phenyl-3-3-(4-dimethylaminophenyl)-pyrazoline, 1-phenyl-3-(4-dimethylaminostyryl)-5-(4-dimethylaminophenyl)pyrazoline, 1-phenyl-3-4-diethylaminostyryl)-5-(4-diethylaminophenyl)-pyrazoline and 1-phenyl-3-(4-diethylaminophenyl)pyrazoline, oxazone compounds such as 2-4-diethylaminophenyl)-4-(4-dimethylaminophenyl)-5-(2-chlorophenyl)oxazole, isoxazole compounds, thiazole compounds such as 2-(4-diethylaminostyryl)-6-diethylaminobenzothiazole, amine derivatives such as triphenylamine and 4,4-bis N-(3-methylphenyl)-N-phenylamino biphenyl, nitrogen-containing cyclic compounds (e.g., stilbene compounds, thiadiazole compounds, imidazole compounds, pyrazole compounds, indole compounds and triazole compounds), condensed polycyclic compounds such as anthracene, pyrene and phenanthrene, poly-N-vinylcarbazole, polyvinylpyrene, polyvinylanthracene and ethylcarbazole/formaldehyde resin.

These charge-transport substances may be used singly or in combination. The amount of the charge-transport substance used is 10 to 50 parts by weight, preferably 20 to 40 parts by weight, per 100 parts by weight of the photosensitive composition.

A silicone oil may be added as required as a levelling agent. If desired, a surface protective layer may be provided to increase the strength of the light-sensitive layer.

Photoconductive Toner

The photoconductive material of this invention may be used as a photoconductive toner by subjecting it to a powderization treatment. To prepare the photoconductive toner, it is desirable to use the rhodanine (I) in an amount of 10 to 40 parts by weight, preferably 20 to 30 parts by weight, per 100 parts by weight of the halogen containing polymer as a binder from the standpoint of the fixability and powder properties of the toner. If the amount of the rhodanine derivative is larger than specified limit, the fixability of the toner to paper in the copy or the agglomerating property of the tone power tends to give rise to a problem. If it is smaller than the specified limit, sufficient photoconductivity to visible light cannot be obtained.

In the photoconductive toner, too, the charge transport material described above with regard to the electrophotographic material may be used in the same manner to increase sensitivity.

The halogen-containing polymer singly acts as a binder resin. It may be used as a blend with a known binder resin which does not contain halogen but has good compatibility with the halogen-containing polymer.

The halogen-containing polymer and the other binder polymer which can be used in combination preferably have a weight average molecular weight of 30,000 to 200,000, particularly 50,000 to 150,000.

When the toner is heat-flexible, the above polymers preferably have a softening point of 50° to 200° C., especially 70° to 170° C.

When the toner is pressure-fixable, a polymer which can be easily deformed plastically, for example an olefinic polymer such as polyfluoroethylene resin, is desirably used as the binder resin.

Since the rhodanine derivative (I) used in this invention has excellent compatibility with the binder resins and good photoconductivity and assumes a brilliant color according to the type of the substituent at the 5-position of the rhodanine ring when dissolved and dispersed in the binder resin, a light-pervious colored photoconductive toner can be obtained.

Various agents can be used to color the photoconductive toner to black or other hues. Examples of the coloring agents include carbon black, lamp black (C.I. No. 77266), Chrome Yellow (C.I. No, 14090), Hansa Yellow (C.I.No,11660, 11630, etc.,) Benzidine Yellow (C.I.No, 2110, etc.), Threne Yellow G(C.I.No,70600), Quinoline Yellow (C.I.No,47005), Permanent orange GTR (C.I.-No,12305), Pyrazolone Orange (C.I.No,21160), Wachung Red (C.I.No, 15868), Permanent Red (C.I.-No,12310, etc.), Brilliant Carmine 3B (C.I.No,16105), Brilliant Carmine 6B (C.I.No, 15850), Du Pont Oil Red (C.I.No,26105), Pyrazolone Red (C.I.No,21110), Lithol Red (C.I.No,15630), Rhodamine B Lake (C.I.-No,451170), Lake Red C (C.I.No,77103), Chalco Oil Blue (C.I.No,aziec Blue 3), methylene Blue Chloride (C.I.No,52015), Phthalocyanine Blue (C.I.No,74260), Malachite Green Oxalate (C.I.No,42000), and oil soluble dyes such as nitrosine dyes, Spilon Black, C.I. Solvent yellow 60, C.I. Solvent Red 27, C.I. Solvent Blue 35, C.I. Solvent Green 125, and C.I. Solvent Brown 5). From the standpoint of photoconductivity and colorability the oil-soluble dyes are preferred.

These coloring agents are used singly or in combination. For example, the coloring agent is used in an amount of 1 to 30 parts by weight, preferably 2 to 20 parts by weight, per 100 parts by weight of the binder resin.

As required, the toner may further contain 0.01 or 5% by weight, based on the binder resin, of a charge controlling agent for controlling its charge. Examples of the charge controlling agent include oil-soluble dyes such as nitrosine dye (C.I. No, 50415B), Oil Black (C.I.-No,26150) and Spilon Black metal soaps which are metal salts (manganese, iron, cobalt, lead, zindc, cerium, calcium, nickel) of naphthenic acid, salicyclic acid, octylic acid, fatty acids or resin acids, metal-containing azo dyes, pyrimidine compounds, and alkylsalicyclic acid metal helates.

Furthermore, to prevent adhesion of the toner to fixing rollers, the toner may contain an offset-preventing agent in an amount of 0.5 to 15% by weight based on its own weight. Examples of the offset-preventing agents are various waxes such as low-molecular-weight polypropylene, low-molecular-weight polyethylene and paraffin wax, low-molecular-weight polymers of olefins having at least 4 carbon atoms, fatty acid amides and silicone oils.

As required, to improve the flowability of the toner, the surface of the toner may be treated with a silane coupling agent, a silicone, or fluorine compound.

The photoconductive toner can be produced by kneading the rhodanine derivative (I), the halogen-containing polymer, a coloring agent, etc., and finely pulverizing the mixture; or by dispersing the mixture in a suitable solvent, and spray-drying the resulting solution to form a toner having a particle diameter of 5 to 50 $\mu$m.

For image formation using the toner prepared according to the invention, there can be used metal plates such as an aluminum plate or a tin plate, drums of such metals, and transparent conductive substrates such as Nesa glass. A toner layer may be formed on the substrate by means known per se. For example, the above toner composition is mixed with a magnetic carrier to form a two-component composition. This composition is supplied to a sleeve having a magnet inside to form a magnetic brush. The conductive substrate is brought into rubbing contact with the magnetic brush to form a toner layer on the substrate. Alternatively, a charge toner is supported on a fur brush, and the conductive substrate is rubbed with the brush to form a toner layer on the substrate. The toner layer can more easily be formed by applying a bias voltage between the conductive substrate and the sleeve or fur brush. The toner layer formed on the conductive substrate is already charged. But if required, the toner layer may further be forcibly charged by means of colona discharge, etc. The thickness of the toner layer is such that the toner particles are spread in one to several layers. The amount of the toner layer formed is generally 8 to 50 g/m² as the weight per unit area.

Imagewise exposure may be effected by uniform exposure of the entire surface by a flash lamp, or slit exposure using a halogen lamp. The amount of exposure may vary greatly depending upon the sensitivity of the photoconductive toner. Generally, the suitable amount of exposure is 50 to 200 lux.sec.

Transfer means may be known corona discharge transfer, or transfer by a roller electrode. The fixation may be carried out by using a pressure-sensitive roller including a heater, or an open heater. The suitable fixation temperature is generally 160° to 200° C.

The following Examples illustrate the present invention more specifically.

EXAMPLE 1

Synthesis of Rhodanine Derivatives (Synthesis Example 1)
Synthesis of 3-carboxymethyl-5-(p-diethylaminobenzylidene)rhodanine

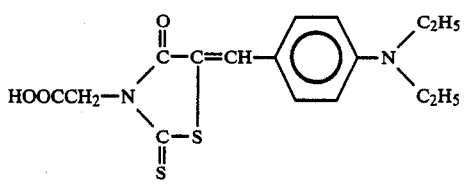

3-Carboxymethylrhodanine (19.1 g) and 17.7 g of p-diethylaminobenzaldehyde was reacted in dimethylformamide at 100° C. Three hours later, water was added to the reaction solution. The resulting precipitate was washed with water, and recrystallized from acetone to give the captioned compound (compound 1) in a yield of 87%.

(Synthesis Example 2)
Synthesis of 3-amino-5-(p-diethylaminobenzylidene)rhodanine

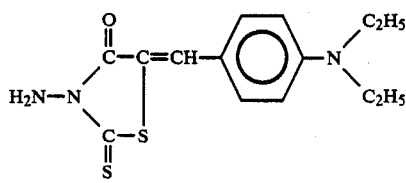

Synthesis Example 1 was repeated except that 3-aminorhodanine was used instead of 3-carboxymethylrhodanine. The captioned compound (compound 2) was obtained in a yield of 72%.

(Synthesis Example 3)
Synthesis of 3-phenyl-5-(p-dimethylaminobenzylidene)rhodanine

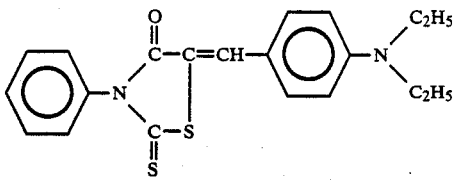

Synthesis Example 1 was repeated except that 3-phenylrhodanine was used instead of 3-carboxymethylrhodanine, and p-dimethylaminobenzaldehyde was used instead of p-diethylaminobenzaldehyde. The captioned compound (compound 3) was obtained in a yield of 78%.

(Synthesis Example 4)
Synthesis of 3-carboxymethyl-5-benzylidenerhodanine

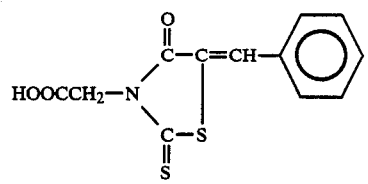

Synthesis Example 1 was repeated except that benzaldehyde was instead of p-diethylaminobenzaldehyde. The captioned compound (comparative compound 1) in a yield of 67%.

Binder Polymers

As binder polymers, polyvinylidene chloride ("Saran", a tradename for a product of Asahi Chemical Industry Co., Ltd.) and a polycarbonate resin ("Panlite L-1250", a tradename for a product of Teijin Chemical Co., Ltd.) were used.

Preparation and Evaluation of Electrophotographic Materials

Fifty parts by weight of each of the above rhodanine derivatives and 100 parts of the polyvinylidene chloride were dissolved in tetrahydrofuran, and the solution was coated on an aluminum foil by means of a doctor blade, and then dried at 100° C. for 30 minutes to prepare an electrophotographic material (10 μm).

As a comparison, an electrophotographic material was prepared in the same way as above except that the polycarbonate resin was used instead of the polyvinylidene chloride.

The electrophotographic material containing the conventional charge generating pigment is non-transparent, whereas the electrophotographic materials prepared in accordance with this invention are transparent, and could well absorb irradiated light with good efficiency.

To examine the charging characteristics and light-sensitive characteristics of the electrophotographic materials, a corona discharge was applied to +6.0 kv for 5 seconds to the electrophotographic materials to charge them negatively by using an electrostatic copying paper testing device (Model SP-428 made by Kawaguchi Electric Co., Ltd.). The surface potential ($V_O$) at this time was measured. The surface of the electrophotographic material was exposed to light from a tungsten lamp while the illuminance on the surface was adjusted to 20 lux. The time which elapsed until the surface potential $V_O$ decreased to $\frac{1}{2}$ was measured, and the half decay exposure amount $E_{\frac{1}{2}}$ was calculated.

The results of measuring the charging characteristics and light-sensitive characteristics of the electrophotographic materials are shown in Table 1.

TABLE 1

| Rhodanine derivative | Binder polymer | $V_O$ (V) | $E_{\frac{1}{2}}$ (lux-sec) |
|---|---|---|---|
| Compound 1 | PVDC | +720 | 5.1 |
| Compound 2 | PVDC | +745 | 8.5 |
| Compound 3 | PVDC | +810 | 5.3 |
| Comparative Compound 1 | PVDC | +715 | 25.2 |
| Compound 1 | PC | +770 | 109.3 |
| Compound 2 | PC | +783 | 110.6 |
| Compound 3 | PC | +855 | 107.7 |
| Comparative Compound 1 | PC | +750 | 112.5 |

PVDC: polyvinylidene chloride rein
PC: polycarbonate resin

As can be seen from Table 1, the electrophotographic materials comprising the compounds 1 to 3 of the invention and the polyvinylidene chloride had excellent charging characteristics and a small half decay exposure amount and showed good electrophotographic characteristics. On the other hand, the electrophotographic material comprising comparative compound 1 in which the benzylidene group introduced into the 5-position of the rhodanine ring had no substituent and the polyvinylidene chloride had little absorption in the visible light resin and had a larger half decay exposure amount and lower sensitivity than when the rhodanine derivative of general formula (I) specified in the invention was used. When the polycarbonate resin having no halogen was used as the binder polymer, the half decay exposure amount was very large and the resulting materials were useless in electrophotography.

EXAMPLE 2

Twenty parts of the rhodanine derivative obtained in Synthesis Example 1 (compound 1), 100 parts by weight of vinylidene chloride resin as a binder, 2500 parts by weight of solution and 500 parts by weight of tetrahydrofuran were fully mixed and dispersed, and the solution was spray-dried to give a photoconductive yellow toner having a central particle diameter of 10 μm. This toner had light sensitivity to blue light in the vicinity of 480 nm. The toner was mixed with an electrophotographic carrier (ferrite carrier, average particle diameter 30 μm), and negatively charged (toner concentration 8%). To toner was applied to an aluminum substrate, and an image was formed under blue light. A brilliant orange image free from skipping in the character portion and background fogging was obtained.

Photoconductive toners having a central particle diameter of about 10 μm were prepared in the same way as above using the rhodanine derivatives obtained in Synthesis Examples 2 and 3 (compounds 2 and 3). Images formed in the same way as above using these photoconductive toners were clear with a brilliant color.

EXAMPLE 3

Synthesis of Rhodanine Derivatives (Synthesis Example 5)

Synthesis of 3-carboxymethyl-5-(p-methylbenzylidene)rhodanine

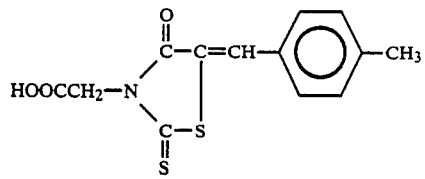

19.1 g of 3-carboxymethylrhodanine and 12.0 g of p-methylbenzaldehyde were reacted in dimethylformamide at 100° C. Three hours later, the reaction solution was added to water. The resulting precipitate was washed with water and recrystallized from acetone to give the captioned compound (compound 4) in a yield of 68 %.

(Synthesis Example 6)

Synthesis of 3-carboxymethyl-5-[2-(3-ethylbenzothiazoline)dimeth]rhodanine

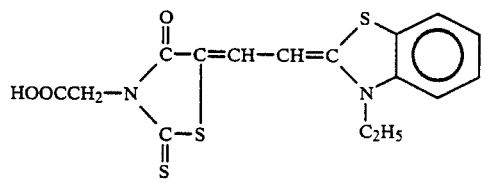

19.1 g of 3-carboxymethylrhodanine, 46.6 g of 2-μ-acetoanilide vinylbenzothiazole ethiodide and 12.1 g of triethylamine were refluxed for 30 minutes in ethanol. The product was recrystallized from pyridine to give the captioned compound (compound 5) in a yield of 45%.

(Synthesis Example 7)

Synthesis of 3-carboxymethyl-5- 2-(1-ethylquinoline)-dimethine rhodanine

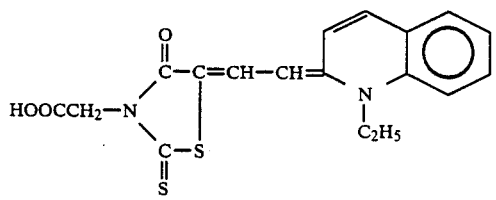

19.1 g of 3-carboxymethylrhodanine, 46.6 g of 2-acetanilidevinylquinoline ethiodide, 12.1 g of triethylamine were refluxed for 30 minutes in ethanol. The product was recrystallized from pyridine to give the catpioned compound (compound 6) in a yield of 50%.

(Synthesis Example 8)

Synthesis of 3-carboxymethyl-5- 4-(1-ethylquinoline)-dimethine rhodanine

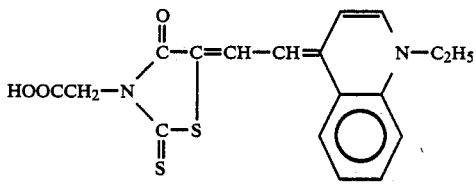

19.1 g of 3-carboxymethylrhodanine, 46.6 g of 4-β-acetanilidevinylquinoline ethiodide and 12.1 g of triethylamine were refluxed for 30 minutes in ethanol. The product was recrystallized from pyridine to give the captioned compound (compound 7) in a yield of 53%.

Preparation and Evaluation of Electrophotographic Materials

As in Example 1, the same polyvinylidene chloride and polycatbonate resins were used as binders, and by combining them with the above rhodanine derivatives, electrodphotographic materials were prepared and evaluated.

The results of evaluation are shown in Table 2.

TABLE 2

| Rhodanine derivative | Binder polymer | $V_O$ (V) | $E_{\frac{1}{2}}$ (lux-sec) |
|---|---|---|---|
| Compound 4 | PVDC | +730 | 5.3 |
| Compound 4 | PC | +783 | 108.9 |
| Compound 5 | PVDC | +715 | 5.3 |
| Compound 5 | PC | +776 | 110.1 |
| Compound 6 | PVDC | +723 | 5.3 |
| Compound 6 | PC | +780 | 115.1 |
| Compound 7 | PVDC | +730 | 4.9 |
| Compound 7 | PC | +760 | 98.6 |

PVDC and PC are the same as the footnote to Table I

EXAMPLE 4

Using the rhodanine derivatives (compounds 4 to 7) obtained in Synthesis Examples 5 to 8, photoconductive yellow toners were prepared in the same way as in Example 2.

The toner obtained from compound 4 had sensitivity to blue light at about 400 nm. This toner was applied to an aluminum substrate and an image was formed under blue light as in Example 2. A brilliant yellow image free from skipping in the character portion and background fogging was obtained.

The toner obtained from compound 5 had sensitivity to green light at about 530 nm. When an image was formed using this toner in the same way as in Example 2 except that green light was used, a clear image with a brilliant red color was obtained as above.

The toner obtained from compound 6 had sensitivity to red light at about 658 nm. When an image was formed using this toner in the same way as in Example 2 except that green light was used, a clear image with a brilliant blue color was obtained as above.

The toner obtained from compound 7 had sensitivity to red light at about 620 nm. When an image was formed using this toner in the same way as in Example 2 except that red light was used, a clear image with a brilliant blue color was obtained as above.

We claim:

1. A photoconductive material for electrophotography comprising a rhodanine derivative and a halogen-containing polymer, the rhodanine derivative being represented by the following general formula (I)

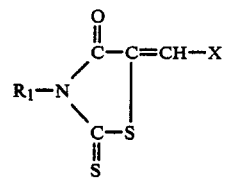

wherein $R_1$ represents a substituted or unsubstituted alkyl, aralkyl, aryl or amino group, and X represents a substituent selected from the class consisting of

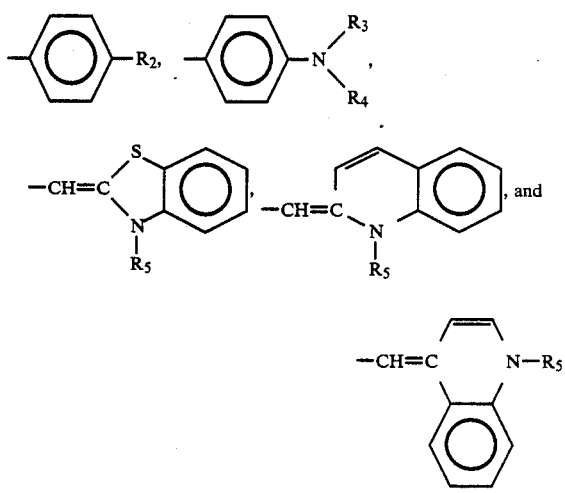

in which $R_2$ represents a lower alkyl group having 1 to 6 carbon atoms, or a hydroxyl group, $R_3$ and $R_4$ are identical or different and each represents hydrogen, an alkyl group or an aryl group, and $R_5$ represents hydrogen, a lower alkyl group having 1 to 6 carbon atoms, an aryl group or a hydroxyl group.

2. The photoconductive material of claim 1 which is for use as an electrophotographic material and in which the ratio of the rhodanine derivative to the halogen-containing polymer is from 20:100 to 200:100.

3. The photoconductive material of claim 1 which is for use as a photoconductive toner and in which the rhodanine derivative is used in an amount of 10 to 40 parts by weight per 100 parts by weight of the halogen-containing polymer.

4. The photoconductive material of any one of claims 1 to 3 in which the halogen-containing polymer is a polyvinylidene chloride resin.

* * * * *